United States Patent [19]

Harris

[11] Patent Number: 5,307,289

[45] Date of Patent: Apr. 26, 1994

[54] METHOD AND SYSTEM FOR RELATIVE GEOMETRY TRACKING UTILIZING MULTIPLE DISTRIBUTED EMITTER/DETECTOR LOCAL NODES AND MUTUAL LOCAL NODE TRACKING

[75] Inventor: James C. Harris, Vienna, Va.

[73] Assignee: Sesco Corporation, Vienna, Va.

[21] Appl. No.: 758,782

[22] Filed: Sep. 12, 1991

[51] Int. Cl.$^5$ .............................................. G01S 13/06
[52] U.S. Cl. .................................... 364/516; 364/460
[58] Field of Search ................... 364/460, 559, 516; 342/352, 457, 191, 356

[56] References Cited

U.S. PATENT DOCUMENTS

| | | |
|---|---|---|
| 3,630,079 | 12/1971 | Hughes et al. |
| 3,742,498 | 6/1973 | Dunn . |
| 3,836,970 | 9/1974 | Reitzig ................. 342/352 |
| 3,866,229 | 2/1975 | Hammack . |
| 3,953,856 | 4/1976 | Hammack . |
| 3,996,590 | 12/1976 | Hammack . |
| 4,347,996 | 9/1982 | Grosso . |
| 4,560,120 | 12/1985 | Crawford et al. . |
| 4,596,988 | 6/1986 | Wanka ................... 342/457 |
| 4,651,156 | 3/1987 | Martinez ............... 342/457 |
| 4,713,768 | 12/1987 | Kosaka et al. . |
| 4,853,863 | 8/1989 | Cohen et al. . |
| 4,884,208 | 11/1989 | Mariuelli et al. ...... 364/460 |
| 4,916,455 | 4/1990 | Bent et al. . |
| 4,976,619 | 12/1990 | Carlson . |
| 5,012,424 | 4/1991 | Dodson . |
| 5,014,006 | 5/1991 | Counselman, III .... 342/352 |
| 5,017,925 | 5/1991 | Bertiger et al. ........ 342/352 |
| 5,019,827 | 5/1991 | Wilson .................. 364/460 |
| 5,148,179 | 9/1992 | Allison . |
| 5,150,310 | 9/1992 | Greenspun et al. . |

OTHER PUBLICATIONS

"Multiple Site Radar Tracking System", B. H. Cantrell and A. Grindlay, IEEE International Radar Conference, pp. 348–354 (1980) Apr.

"Decentralized Processing in Sensor Arrays", Mati Wax and Thomas Kailath, IEEE Transactions on Acoustics, Speech, and Signal Processing, vol. ASSP-33, No. 4, Oct. 1985, pp. 1123–1128.

Primary Examiner—Jack B. Harvey
Assistant Examiner—Thomas Pesso
Attorney, Agent, or Firm—Hoffman, Wasson & Gitler

[57] ABSTRACT

A method and system for tracking various objects utilizing a plurality of sensors. Separate locations or platforms are provided with a number of sensors collocated with an energy generation/reflection device, and also a communication device. Each of the platforms is termed local nodes of a multi-sensor fusion system, and possibly can experience relative translational and/or rotational motion in as many as three dimensions with respect to itself and with respect to similar local nodes. Each local node is capable of measuring some combination of bearing angles and/or range and/or respective derivatives from the local node to cooperative local nodes by generating or reflecting energy such that cooperative local nodes may obtain mutual sensor measurements. Information obtained or processed by each local node, including track data or track estimates, are possibly transmitted to one or more central nodes denoted as fusion centers provided with processing capabilities. In addition, when an object or multiple objects which are not local nodes are being tracked, at least one cooperative local node can measure bearing angles and/or range and/or respective derivatives from the local node to the other object. After undergoing a series of processes, sensor data from multiple local nodes are combined at the fusion centers to provide estimates of both the relative geometry and relative orientation of each cooperative local node with respect to other cooperative local nodes and the relative geometry of other sensed objects with respect to each cooperative local node. Estimated relative geometries are either range normalized or scaled with actual ranges depending upon sensor capabilities.

27 Claims, 11 Drawing Sheets

LEGEND

Communication Path

Sensor Capability

Communication Capability

Data Fusion Capability

Energy Emission Capability

LEGEND

| | |
|---|---|
| —⌁— | Communication Path |
| S | Sensor Capability |
| △C | Communication Capability |
| F | Data Fusion Capability |
| ☼E | Energy Emission Capability |

LEGEND

Communication Path

Sensor Capability

Communication Capability

Data Fusion Capability

Energy Emission Capability

LEGEND

Communication Path

Sensor Capability

Communication Capability

Data Fusion Capability

Energy Emission Capability

5,307,289

METHOD AND SYSTEM FOR RELATIVE GEOMETRY TRACKING UTILIZING MULTIPLE DISTRIBUTED EMITTER/DETECTOR LOCAL NODES AND MUTUAL LOCAL NODE TRACKING

CROSS-REFERENCED DISCLOSURE DOCUMENT

This invention relates in part to subject matter described in Disclosure Document No. 235417.

FIELD OF THE INVENTION

The present invention pertains to the general field of object state tracking, and more specifically to the field of spatially distributed multi-sensor object state tracking. Related fields are those which require some subset of estimates of the relative geometries and relative orientations between multiple sensor platforms and the relative geometries between multiple sensor platforms and other objects. Related fields include navigation, guidance, surveillance, landing aids, fire control, and robotic motion control.

BACKGROUND OF THE INVENTION

The process of object state tracking has been accomplished for many years in a myriad of different ways. State tracking implies that some qualities of an object's geometry relative to a sensing device are being followed and estimated. These qualities are estimated by sensing the generated/reflected energy emissions of the object. Qualities of relative geometry which are tracked include range and/or bearing and/or the respective derivatives from a sensor to the energy source. The expressions state tracking and tracking are often used synonymously in the literature and will be used as such within this document. Early tracking methods often utilized single sensors. To achieve improved tracking accuracy these single sensors were upgraded or replaced with sensors having improved accuracy. Current methods continue to primarily utilize single sensors, although a trend is developing toward mixed mode and multi-sensor systems to overcome the limitations of single sensor systems.

Mixed mode systems utilize different types of sensors such as combined Radio Frequency (RF) and optic sensors collocated upon the same platform. Mixed mode systems are generally utilized when one sensor type complements the capabilities of another sensor type. One sensor type, for example, might have long range detection capability for initial tracking, and another collocated sensor type which has better but range limited accuracy is utilized to provide improved short range tracking. An example of a mixed mode multiple sensor system is U.S. Pat. No. 3,630,079, issued to Hughes.

Multi-sensor systems are utilized to overcome several limitations of single sensor systems. Multiple sensors provide an increasing quantity of available measurements as additional sensors are utilized. A greater number of measurements from multiple collocated sensors, for example, is combined to improve the statistics of tracking system estimates. Additionally, single sensor systems encounter significantly decreased accuracy when tracked objects are in poor relative geometry with the sensor. Multiple geometrically distributed sensors can significantly relieve this problem by viewing the object from different geometric perspectives. Another limitation of single sensor systems is that they are unable to provide information about the relative orientation of multiple bodies, whereas multiple sensor systems have this capability.

The field of spatially distributed multi-sensor tracking is an emerging one, having its major roots beginning around 1980 with developments sponsored by MIT Lincoln Labs. The problems addressed in this field are typically so highly constrained that results are usually not reusable in different multi-sensor tracking situations. Prior art systems, for example, are typically constrained with sensor array formations whereby sensors are permanently fixed at well known (a priori) relative locations and/or orientations. FIG. 1 depicts a typical prior art sensor platform arrangement. Sensors are arranged in an array grid having well known and often equal spacings between sensor elements, i.e. $r_x$ and $r_y$ known. Position vectors between sensor platforms are typically either directly measured with distance measuring equipment, or inferred through the use of an external absolute coordinate determination system such as any navigation system or Global Positioning System (GPS). The relative orientation between the coordinate frames in which pairs of sensor elements function is also typically well known, often identical, and not allowed to change dynamically. Sensors utilized in prior art multi-sensor systems, for example, are very often located upon the same rigid body. Additionally, these sensor arrays are not allowed to experience Own-Body motion or relative motion, and three dimensional problems are often approximated with substantially inaccurate two dimensional models. Prior art multi-sensor tracking methods also typically do not have the flexibility to utilize any combination of range, bearing, and respective derivative information as such information is available. Most major prior art developments are related to either distributed acoustic sensors or distributed ground based radars. Examples include Mati Wax and Thomas Kailath, "Decentralized Processing in Sensor Arrays" published in IEEE Trans. Acous. Speech Sig. Proc., ASSP-33, October 1985 pp. 1123–1128 and Cantrell, B.H., and A. Grindley, "Multiple Site Radar Tracking System" published in Proc. IEEE Int. Conf., April 1980 pp. 348–354.

A typical prior art distributed multi-sensor data fusion information flow diagram is shown in FIG. 2. The first process represented by Block I is to estimate relative sensor positions and alignments. A common prior art example is to align cooperative ground based radars with magnetic or true north. Alignment information is passed to Block V where it is stored for future use. The Measurement process, Block II, provides sensor data measurements of various sensed objects from the radar sites (local nodes) to a central processing agent via Block III, the Communication process. At the central node, the Object Association and Tracking process, Block IV, associates sensor data with common targets and updates object track filters as required. Results are passed to Block V, the Earth Coordinate Mapping and Fusing process, whereby fusion estimates are generated in a common coordinate frame, such a coordinate frame typically being earth coordinates. The fusion estimates are then passed to the Application Interface process, Block VI, which makes the estimates available to the application.

There are many different fusion system architectures which can be implemented to optimize performance under the given multi-sensor tracking system constraints. Examples of fusion system architectures include hierarchical, centralized tracking, and sensor level tracking. Sensor level tracking systems form object tracks at the sensor level. Centralized tracking systems gather sensor data at a single node and all tracking and fusion processing takes place at the central level, or central node. Hierarchical architectures combine the sensor data from groups of local nodes at an intermediate level. Intermediate level nodes feed higher level nodes until possibly reaching a central level. Any node where data processing takes place is generally referred to in the literature as an agent node. Any node where data from multiple sensors is combined (fused) is termed a fusion agent node or fusion node. The combination of a sensing device and a capability for communications with agent nodes is generally referred to as a local node. A local node which is also an agent node is sometimes additionally referred to as a local agent node.

A closely related area is that of multiple object track association. Developments in this area are concerned with associating a set of multiple objects tracked by a sensor with the set of objects tracked by another sensor. Objects appearing to have identical trajectories and falling within a confidence contour (gate) are determined to be common to each set of tracked objects. Early work in this area was concerned the problem of handing off a tracked object from one ground based radar to another. Multiple object track association has more recently received amplified attention due to programs sponsored by the U.S. Army and the Strategic Defense Initiative Organization (SDIO) for analysis of extended threat clouds. Much of the scholastic research in this area is occurring at the University of Connecticut Department of Electrical and Systems Engineering. Examples of work in this area include Blackman, S.S., "Multiple Target Tracking with Radar Applications" published by Artech House, Dedham, Ma 1986 and Bar-Shalom, Y., and T.E. Fortmann, "Tracking and Data Association" published by Academic Press, New York, 1988.

A research area just now receiving attention is concerned with a process termed registration. Registration is the process of determining the relative orientation of one sensor to that of cooperating sensors. The prior art typically does not consider the case of dynamic relative sensor orientations. Cooperative sensors in prior art multi-sensor systems, for example, are typically not located upon different platforms having relative Degrees of Freedom. A representative example of the prior art is one that determines the relative orientation of earth fixed cooperative sensors, a specific example being multiple cooperative ground based radar sites. Prior art techniques for accomplishing the registration process are typically restricted to determining bias offsets about only a single coordinate axis, such as determining the azimuth offset of cooperative ground based radar sites. This is accomplished through various forms of stochastic filtering, including a model of the geometry of multiple radar sites and the tracks of mutually tracked aircraft. An example of efforts in the area of sensor registration is Fischer, W.L., C.E. Muehe, and A.G. Cameron, "Registration Errors in a Netted Air Surveillance System", MIT Lincoln Laboratory Technical Note 1980-40, Sep. 2, 1980 AD-AO93691.

Examples of other patented multi-sensor tracking systems are U.S. Pat. Nos. 4,916,455 issued to Bent et al, 4,976,619 issued to Carlson, and 4,853,863 issued to Cohen et al. These systems utilize cooperative sensors having no relative motion at precalibrated relative positions. The patents to Bent et al and Carlson accomplish position tracking utilizing range-only triangulation whereby the sensor platform orientation is not required or estimated. The patent to Cohen et al uses arrays composed of three non-colinear sensors having known relative positions and orientations which are located upon a 6 Degree of Freedom (6DOF) platform. A different 6DOF platform has three non-colinear emitters at known positions. Geometric relationships are utilized to determine the relative orientations of the two platforms.

OBJECTS OF THE INVENTION

The primary object of this invention is to provide a novel method for relative geometry and relative orientation state tracking which can obtain much greater accuracies than the prior art. An additional object is to provide a modular method such that any fusion system architecture can be implemented by simply rearranging the basic processing blocks. Additional objects of the invention include elimination of the following prior art restrictions: that tracking sensor platforms are in well known (a priori) permanently fixed locations; that tracking sensor platforms require utilization of an external absolute coordinate determination system such as any navigation system or GPS to estimate relative platform geometries; that the relative orientation between the coordinate frames in which pairs of sensor elements function is well known and not allowed to change dynamically; that tracking sensor platforms do not experience their own dynamic motion; that tracking sensor platforms do not experience relative dynamic motion; that there is no flexibility for utilization of any combination of range, bearing, and respective derivative information as available.

SUMMARY OF THE INVENTION

The method of the present invention and the system utilizing this method will be referred to as The Smart Weapon Adjustable Aspect and Ranging Munition (SW&RM) Tracking Method which has numerous advantages over the prior art, whereby a collection of several distinct processes are utilized to accomplish mutual local node relative geometry and relative orientation state tracking, and relative geometry tracking of other energy emission sources. The invention addresses significant deficiencies in several areas of the prior art of multi-sensor tracking, including most notably, the areas of sensor platform motion, relative geometry determination, and multiple platform sensor orientation registration.

The acronym SW&RM may be misleading since the SW&RM Tracking Method is capable of accomplishing angle-only multi-sensor tracking using range normalized coordinates when only bearing information is available. There are applications where inferring or measuring range is not necessary or required, an example being Line of Sight (LOS) guidance. Additionally, there are numerous applications where a local node is not a munition, examples being command guidance, fire control systems, landing aids, and pure tracking applications such as surveillance and airport air traffic control.

The SW&RM Tracking Method requires platforms containing one or more sensing devices collocated with an energy generation/ reflection device, and also a communication system. These platforms are termed local nodes of a multi-sensor fusion system, and possibly experience relative translational and/or rotational motion in as many as three dimensions with respect to itself and with respect to similar local nodes. Each local node is capable of measuring some combination of bearing angles and/or range and/or respective derivatives from the local node to cooperative local nodes and can generate or reflect energy by which cooperative local nodes may obtain mutual sensor measurements. Information obtained or processed by each local node, including track data or track estimates are transmitted to one or more central nodes denoted as fusion centers provided with processing capabilities. In addition, when an object or multiple objects which are not local nodes are being tracked, at least one cooperative local node has a means for measuring bearing angles and/or range and/or respective derivatives from the local node to the other object.

The SW&RM Tracking Method executes a combination of various processes prior to obtaining a multiple local node fusion track estimate, an example of which is shown in FIG. 4. These processes include: a tracking sensor measurement process termed Measurement; an Own-Body motion identification and sensor data mapping process termed Own-Body Motion Elimination; an object association and tracking process, termed Object Association and Tracking, by which sensor data is received as input by a tracking filter and by which a track data estimate is formed; a communication process, termed Communication, by which sensor data or track data estimates are communicated from local nodes to fusion agents; a process termed Relative Geometry, by which the relative geometry and dynamics thereof between cooperating local nodes and other tracked objects is estimated; a process termed Mutual Orientation, by which the relative orientation and dynamics thereof between cooperating local nodes is estimated; and a process termed Perspective Mapping, whereby the tracks of cooperative local nodes to each other and to other objects is cast into a common coordinate frame by fusion agents and whereby probabilistic weightings are applied to track data estimates and the estimates are combined (fused). The probabilistic weightings are based upon actual track data statistics or upon estimates of track data statistics such as estimates which are derived from Geometric Dilution of Precision (GDOP) factors.

Contrary to the prior art, the SW&RM Tracking Method requires that sensor platforms (local nodes) which provide measurement data or track data estimates of any mutually tracked objects to a common data fusion node are also required to provide some subset of measurement data or track data estimates of tracks formed from each cooperative local node to the other. Clearly, an additional requirement of the SW&RM Tracking Method is that cooperative nodes emit or reflect energy that can be mutually detected. The Measurement process, in addition to providing sensor measurement data associated with target objects, is therefore also required to provide some combination of bearing angles and/or range and/or respective derivative measurements between some application dependent subset of cooperative local nodes. Additionally, the Object Association and Tracking process is required to estimate the relative tracks between these cooperative local nodes.

Local node to local node tracking is a unique key element of the SW&RM Tracking Method which separates the instant method and system from the prior art. The availability of local node-to-local node track data at the fusion agents is what allows the SW&RM Tracking Method to accomplish the required processes at a high level of resolution even while local nodes experience Own-Body motion and relative motion. There are situations where some local node to local node tracks are not available, and in which the SW&RM Tracking Method is still applicable and makes sense. An example is the virtual object tracking problem where a local node to local node track is broken, or where a particular local node is not capable of tracking another local node, but where the track can be inferred based on the observations of other local nodes. The SW&RM Tracking Method begins to break down and lose its utility when fewer local node to local node tracks are available. The method approaches equivalency with the prior art in those situations where relative local node to local node track information is not available, and relative local node positions and orientations are well known.

The Own-Body Motion Elimination process identifies the pertinent parameters of the Own-Body dynamic motion of a local node. A motion filter is employed which maps data obtained from the Measurement process within the local node body coordinates onto a synthetic coordinate frame whereby the effects of Own-Body motion is removed from the data. Such a synthetic coordinate frame of a local node is termed its Egocentric Coordinate Frame. This process allows a multi-sensor tracking system local node to experience Own-Body motion with little statistical impact upon fusion estimates. If no Own-Body motion occurs, then the Egocentric Coordinate Frame is simply oriented at some arbitrary constant offset from the sensor orientation.

The Object Association and Tracking process performs the tasks of data association and object tracking. If only bearing information is available during the entire tracking timeline, then range information is not and cannot be inferred and is not utilized. If, however, range rate between a tracked object and a local node is known together with bearing information, then "own ship maneuvers" allow the agent which processes the local node measurement data to estimate range from the local node to the tracked object. Data processing is accomplished at the local node level if the local node is also an agent, or at some other fusion agent level depending upon design considerations such as communication load and system architecture and complexity. Statistical theory indicates that an optimal fusion solution can only be accomplished if all local node sensor measurements are communicated to at least one common fusion agent individually. Suboptimal solutions may be obtained if the Object Association and Tracking process occurs at some level other than a central level, and if each local node communicates sensor data or track data estimates to fusion agents at intervals greater than the individual measurement interval. The optimal fusion solution requires a greater communication capability, results in greater fusion system complexity, and at a minimum only requires a single computational unit. The suboptimal fusion solution, however, places fewer demands upon communication capability, and results in a less complex fusion system, but provides degraded performance and requires computational units for multiple fusion agent nodes.

The Communication process is an information transmission pipeline between local nodes and fusion agents. The actual type of data transmitted and received depends upon system design considerations such as fusion system structure, available communication bandwidth, and desired accuracy.

The Relative Geometry process estimates the relative geometry and dynamics thereof between the various triplets of local node pairs and mutually tracked objects including other local nodes. By relative geometry is meant the shape of the triangle connecting the various combinations of local node pairs and mutually tracked third objects. This process is equivalent to determination of the ratio of the distance from each local node to the third object to the distance between the local node pair. If range information is available, relative geometry also means determination of the triangle leg sizes. Combinations of range and bearing are utilized as the information is available to estimate each triangle shape. The Relative Geometry process may make use of, but does not require position information from any external navigation system or GPS. Although structures having more legs than three may be estimated through a complex stochastic filter, these structures decompose into statistically equivalent combinations of local node and third object triplets.

The Mutual Orientation process solves simultaneous equations to estimate the relative orientations and dynamics thereof between pairs of local node Egocentric Coordinate Frames. A stochastic filter tracks the bias angles such that pairs of Egocentric Coordinate Frames may undergo relative rotational motion. The relative orientation between the coordinate frames in which pairs of sensor elements function, therefore, is not necessarily known a priori, and may be dynamic.

The Perspective Mapping process utilizes the results of previous processes to map track data provided by each local node onto a common coordinate frame. Choice of the common coordinate frame depends upon the required use of the fusion estimate. The data is fused utilizing weightings based on actual or estimated data statistics and forwarded to the Application Interface process which makes fusion estimates available to the application.

The sequence in which the SW&RM Tracking Method processes are executed depends upon the fusion system architecture. Examples of fusion system architectures include hierarchical, centralized tracking, and sensor level tracking. There are many different combinations of execution sequences, each of which may be better suited to some particular application.

DESCRIPTION OF THE FIGURES

The above and other objects and features of the invention will become apparent from the following detailed description taken in connection with the accompanying drawings which form a part of the specification, and in which.

DETAILED DESCRIPTION OF THE PRESENT INVENTION

The SW&RM Tracking Method is a multi-sensor tracking method which requires local nodes and fusion centers having special capabilities. Each local node at a minimum includes: a device for measuring some combination of bearing angles and/or range and/or respective derivatives from the local node to cooperative local nodes; a device for generating energy or a capability to reflect energy by which cooperative local nodes may obtain mutual sensor measurements; and a device for communicating sensor data or track data estimates from the local node to fusion agents. In addition, when an object or multiple objects which are not local nodes are being tracked, at least one cooperative local node has a means for measuring bearing angles and/or range and/or respective derivatives from the local node to the other object. Each local node which forms object motion tracks locally additionally has a processor. Each fusion center is located within the system according to a selected fusion system architecture, and minimally includes a processor and a communication system.

Figure 1:
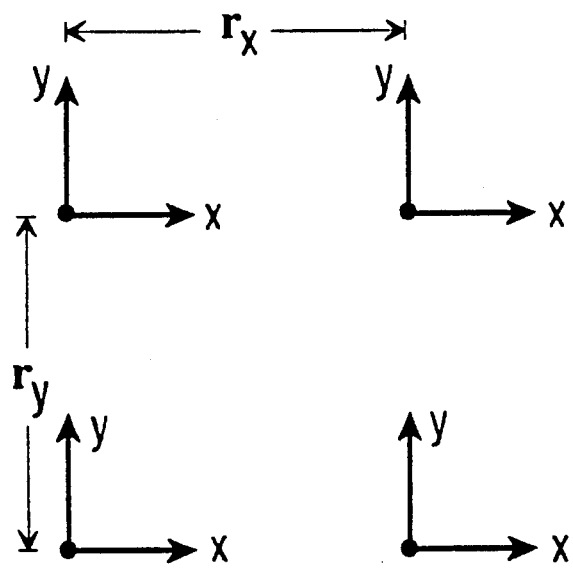
FIG. 1 depicts the typical prior art sensor platform arrangement.
Figure 2:
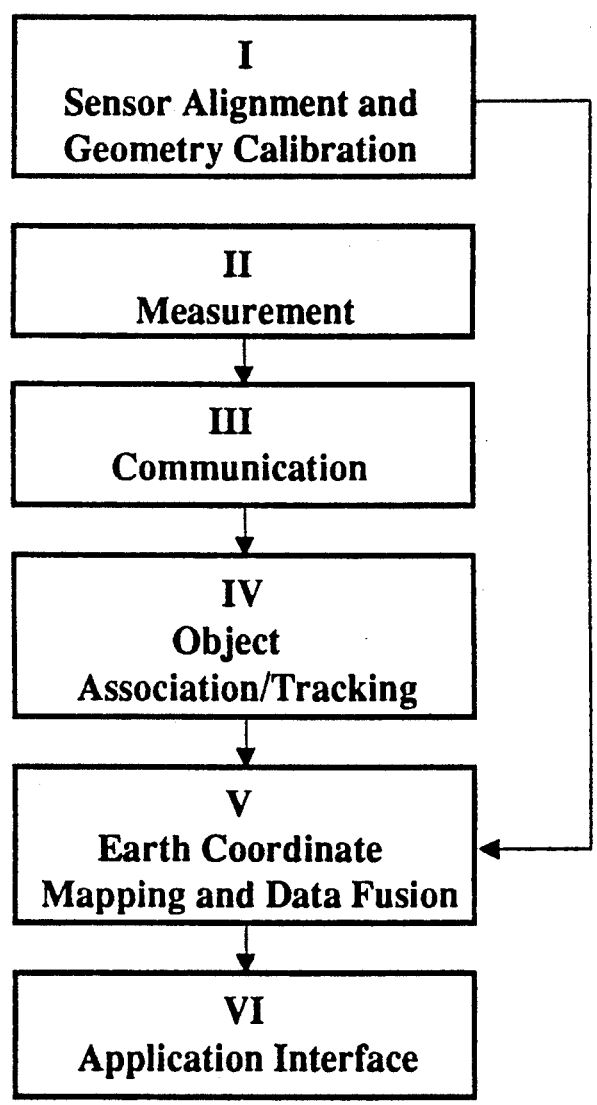
FIG. 2 is an information flow diagram of the typical prior art multi-sensor tracking system implementation.
Figure 3:
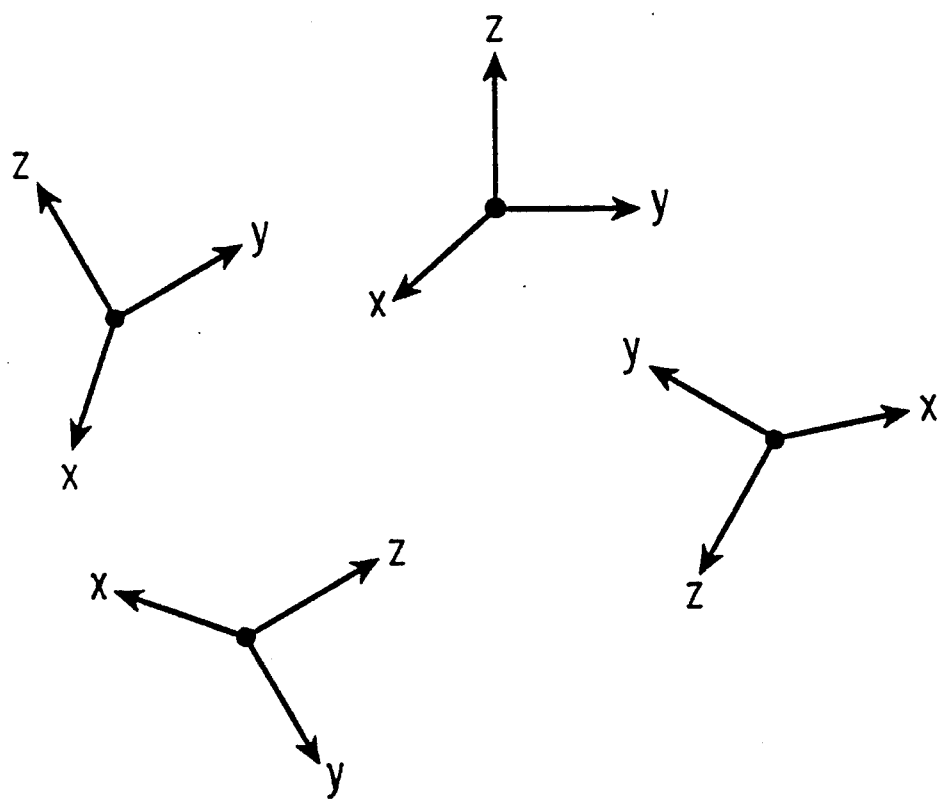
FIG. 3 is a typical sensor platform arrangement according the present invention.

In contrast to the typical prior art distributed multi-sensor tracking system, SW&RM local nodes may be at any arbitrary position and orientation as depicted by FIG. 3. Additionally, SW&RM local nodes may experience their own dynamic motion and relative translational motion with respect to each other and with respect to any other sensed objects.

Figure 4:
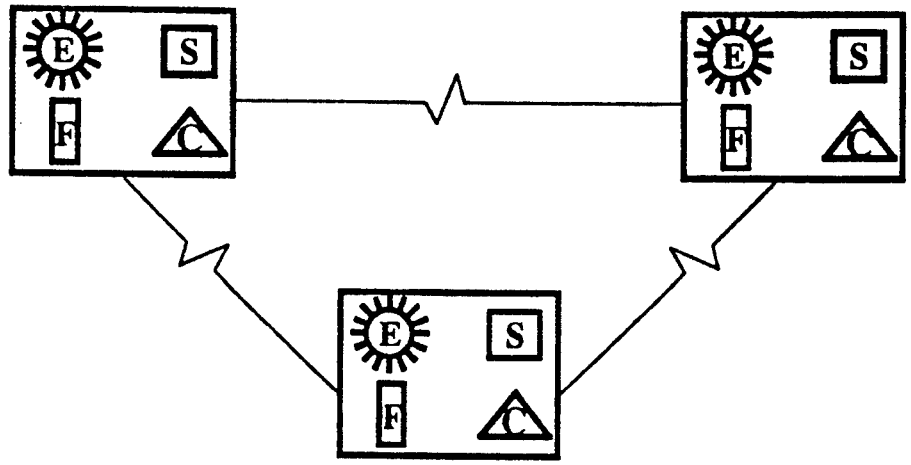
FIG. 4 is a symbolic diagram of a sensor level fusion system implementation of the present invention.
Figure 5:
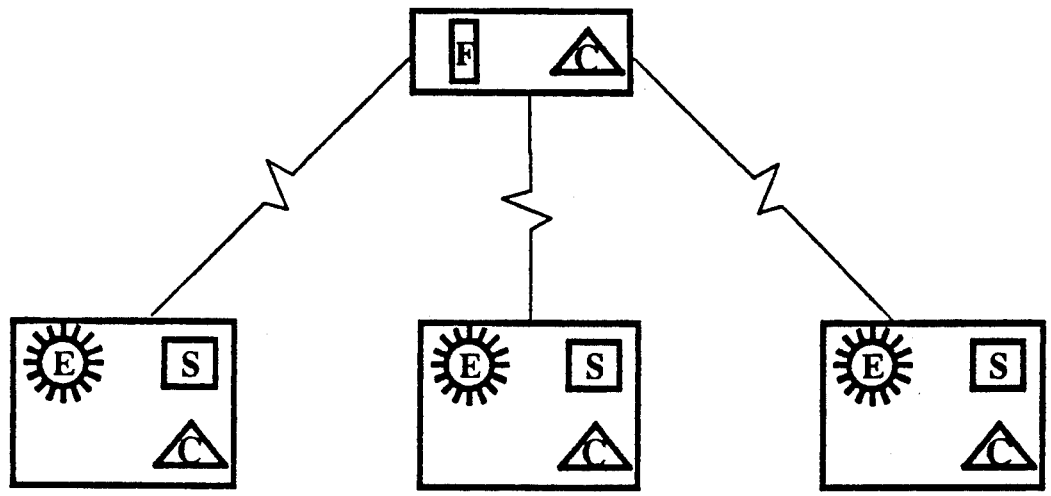
FIG. 5 is a symbolic diagram of a central level fusion system implementation of the present invention.
Figure 5:
Figure 5:
Figure 5:
Figure 5:
Figure 5:
Figure 6:
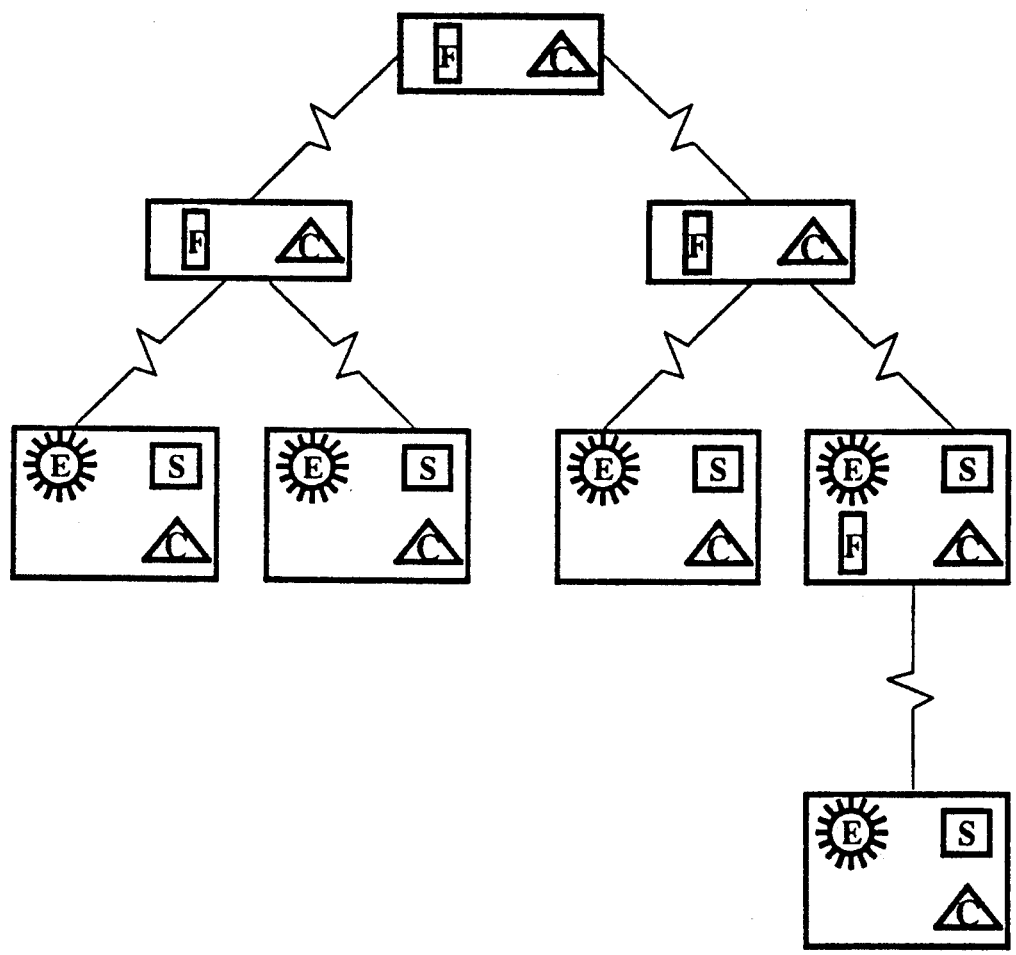
FIG. 6 is a symbolic diagram of a hierarchical fusion system implementation of the present invention.
Figure 6:
Figure 6:
Figure 6:
Figure 6:
Figure 6:

Cooperative SW&RM local nodes may be distributed in many different fusion system architectures. Various fusion system architectures yield different sets of advantages and disadvantages, and certain fusion system architectures are better suited for particular applications. FIGS. 4 through 6 illustrate some examples of SW&RM local nodes employed in three different fusion system architectures. It is noted that additional architectures may be employed.

FIG. 4 shows a group of cooperative SW&RM local nodes employed in a sensor level fusion system architecture, whereby each local node also acts as a fusion agent node. Each such local node has a fusion agent processor, together with the three basic capabilities required of a SW&RM local node, namely, a sensor, an energy generation device or energy reflection capability, and communication system. SW&RM local nodes employed in a sensor level fusion system architecture process track filters locally, and communicate to other fusion agents sensor data or track data estimates which may possibly include associated statistics.

FIG. 5 shows a group of cooperative SW&RM local nodes and a separate fusion center employed in a central level fusion system architecture. Each such local node has the basic SW&RM local node capabilities, and provides sensor data or track data estimates to a common central fusion agent. The central fusion agent typically only requires communications and fusion processor capabilities. If a SW&RM local node provides track data estimates to the fusion agent, then such a local node must also have a processor to process track filters.

FIG. 6 shows a group of cooperative SW&RM local nodes, possibly also acting as fusion agents, and several separate fusion centers. FIG. 6 is an example of an hierarchical fusion system architecture. Those SW&RM local nodes provide sensor data or track data estimates to intermediate level fusion agents which then communicate fused track data estimates to higher level fusion agents until reaching the highest level fusion agent within that branch of the hierarchy. High level agents may feed back global or partially global fused estimates to lower level agents for update of the lower level tracks. SW&RM local nodes within an hierarchical fusion system architecture have the three basic capabilities of all local nodes, together with any local fusion agent processor capability, or local track filter processor capability as required by the particular application. Most system architectures, including the sensor level and central level system architectures, can be viewed as degenerative cases of the hierarchical fusion system architecture.

Figure 7:
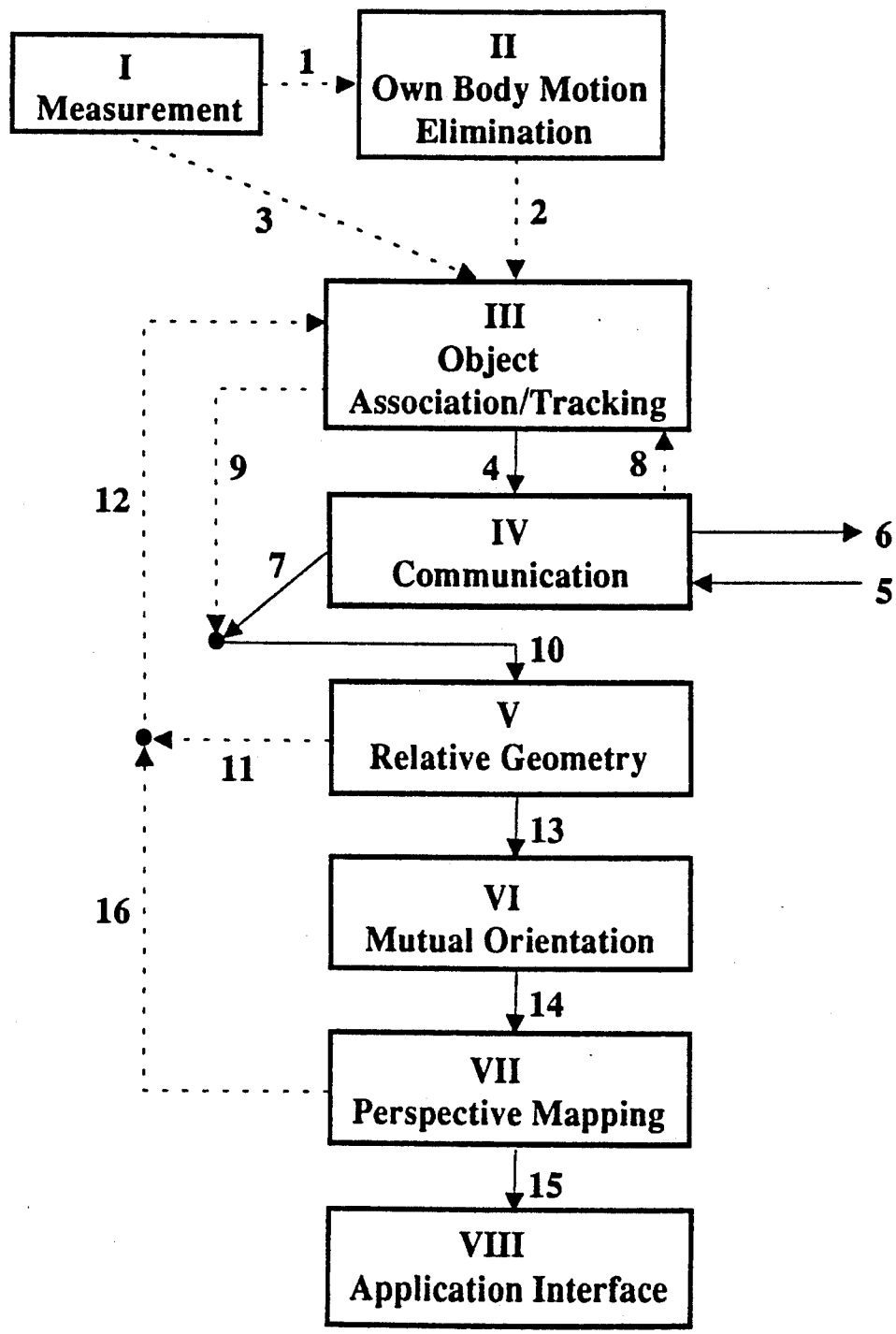
FIG. 7 is an information flow diagram of a possible sensor level fusion architecture implementation of the present invention.

The SW&RM Tracking Method executes a combination of various processes, a possible example of which is shown in the sensor level fusion example illustrated by the information flow diagram of FIG. 7. The sensor level fusion system architecture is used as an example by which the various processing blocks of the SW&RM Tracking Method are demonstrated. There are, of course, many other ways to interconnect the basic processing blocks to achieve different system architectures, including those architectures previously discussed.

The sensor level fusion system architecture example, FIG. 7, shows the SW&RM processing block components and an example data flow diagram. The solid lines represent mandatory information flow paths, and the dashed lines represent optional information flow paths. If a local node is not experiencing Own-Body motion, for example, information flows directly from the Measurement process, Block I, to the Object Association and Tracking process, Block III, circumventing the Own-Body Motion Elimination process, Block II. The Measurement process, Block I, provides some combination of bearing angles and/or range and/or respective derivative measurements between some application dependent subset of cooperative local nodes, and between local nodes and other tracked objects. If the local node is experiencing its own motion, then the measurement data flows to Block II via path 1, otherwise the data flows directly to Block III via path 3. If the measurement data is passed to Block II, the Own-Body Motion Elimination process, a coordinate mapping process is accomplished and the data is passed to Block III, the Object Association and Tracking process, via path 2. At Block III, sensor data is associated with the proper object track and each object track is updated.

The updated track data is the passed optionally with track data statistics to Block IV, the Communication process, via path 4. A subset of this data is then communicated to fusion agents which might possibly include other local nodes via path 5 and then forwarded via path 7. Similar data is received from other local nodes and/or fusion agents via path 6. If received data includes actual measurements and possibly associated statistics provided by other local nodes rather than track data estimates, then these measurements are passed to Block III via path 8, otherwise this data is also forwarded via path 7. Data that was passed back to Block III via path 8 is operated upon as previously described and then forwarded via path 9. Data forwarded via paths 7 and 9 are combined at the joining node and forwarded to Block V, the Relative Geometry process, via path 10. The data supplied to Block V is operated upon and passed together with results to Block VI, the Mutual Orientation process, via path 13. Enhanced range information, if available, is optionally fed back to Block III, the Object Association and Tracking process via path 11/12, in which event the local track filters are updated. The data supplied to Block VI is operated upon and passed together with results to Block VII, the Perspective Mapping process, via path 14. Desired object motion fusion estimates are determined, and the results are passed to Block VIII, the Application Interface process, via path 15. Block VII may also pass fusion results to Block III, the Object Association and Tracking process via path 16/12, in which event the local track filters are updated with the fusion estimates.

Figure 8:
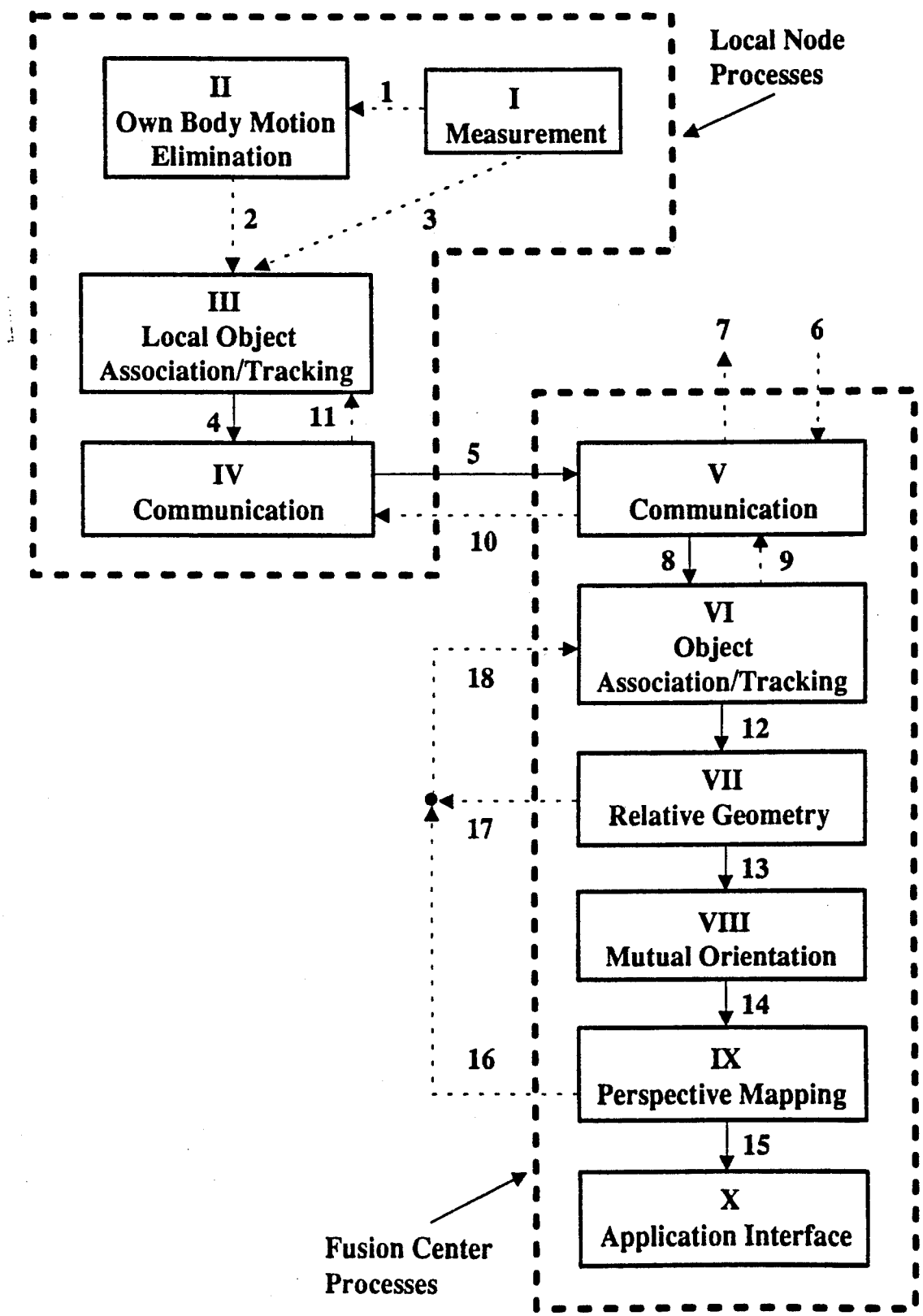
FIG. 8 is an information flow diagram of a possible hierarchical fusion architecture implementation of the present invention.

Processes associated with each of the processing blocks of the sensor level fusion system architecture example, FIG. 7, are conducted wholly within the cooperative local nodes. Other fusion system architectures, however, allow some of the processes to be accomplished remotely. FIG. 8, for example, shows one of many possible information flow diagrams utilizing a hierarchical fusion system architecture, whereby only Blocks I through IV are processed at the local node level, while Blocks V through X are processed at a remote fusion center. The fusion system architecture shown in FIG. 8 is well suited for those applications where it is desirable to distribute the processing load and/or minimize communications requirements. Multiple fusion centers may cooperate in a hierarchical architecture by exchanging track data estimates over the communication paths 6 and 7. FIG. 8 may also represent a centralized fusion architecture, in which case there is only one processing site and communication paths 6 and 7 are not utilized.

Figure 9:
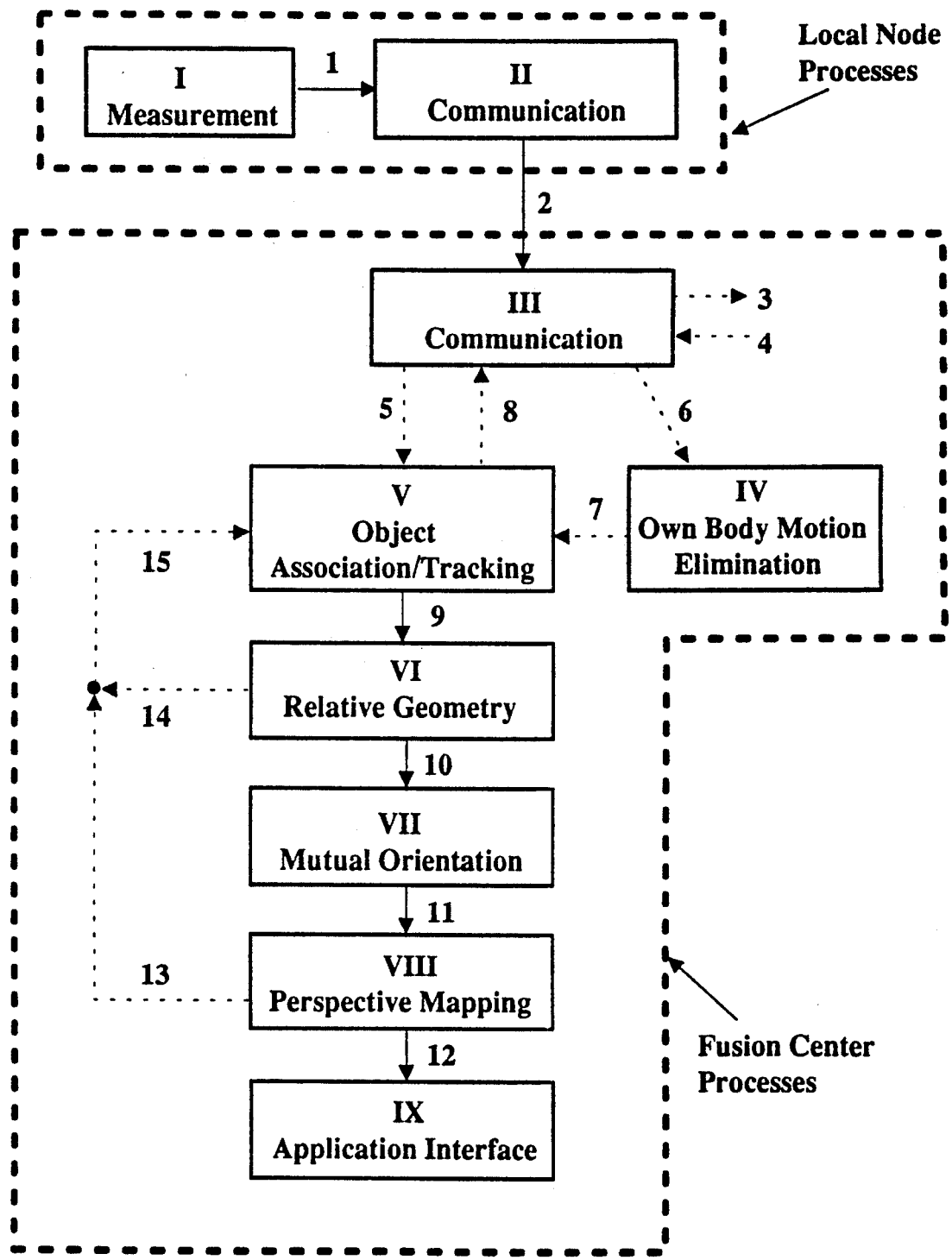
FIG. 9 is an information flow diagram of a possible hierarchical fusion architecture implementation of the present invention.

The fusion system architecture information flow diagram shown in FIG. 9 may be applied in those situations where a large communications bandwidth is available and/or where it is desirable to centralize the processing capability. FIG. 9 is an example of a fusion system architecture whereby only Blocks I and II are processed at the local node level, while Blocks III through IX are processed at a remote fusion center. Multiple fusion centers may cooperate in a hierarchical architecture by exchanging track data estimates over communication paths 3 and 4. FIG. 9 may also represent a centralized fusion architecture, in which case there is only one processing site and communication paths 3 and 4 are not utilized. The situation whereby all sensor measurements made by all cooperative local nodes are available at a common fusion node is the only case in which an optimal fusion may be achieved. The fusion system architecture represented by FIG. 9 allows such an optimal fusion to be accomplished.

Sensor data is made available by the Measurement process which occurs at the local node level. A combination of bearing and/or range measurements and/or the respective derivatives are made from each local node to various objects. Sensed objects possibly include cooperative local nodes, target objects, reference objects, and objects of convenience. The Measurement process also provides any data collected by sensor subsystems such as navigation or GPS systems.

The types of measurements required from the Measurement process by other processes depends upon the type of application and the type of a priori knowledge available. If cooperative local nodes are in very well known positions and orientations (i.e. the prior art), then range-only information is adequate although bearing information is useful. If, however, local nodes experience unknown Own-Body or relative orientation dynamic motion, then a minimal set of angular bearing measurements between cooperative local nodes is required by the Mutual Orientation process as described in the section regarding this process.

The Own-Body Motion Elimination process identifies the pertinent parameters of the Own-Body dynamic motion of a local node, and the process is only utilized in those cases where such motion exists. A motion filter is employed which maps any angular data obtained from the Measurement process into a synthetic coordinate frame, termed the Egocentric Coordinate Frame, whereby the effects of Own-Body motion are removed from the data. This process allows a multi-sensor tracking system local node to experience Own-Body motion with little statistical impact upon fusion estimates. If no Own-Body motion occurs then the Egocentric Coordinate Frame is simply oriented at some arbitrary constant orientation relative to the sensor orientation. In this event, sensor data simply undergoes the coordinate transformations required to map the sensor data from the sensor orientation into the Egocentric Coordinate Frame. If the Egocentric Coordinate Frame is chosen to be identically orientated with the sensor, then the coordinate transformations are zero angle transformations and do not need to be implemented.

Figure 10:
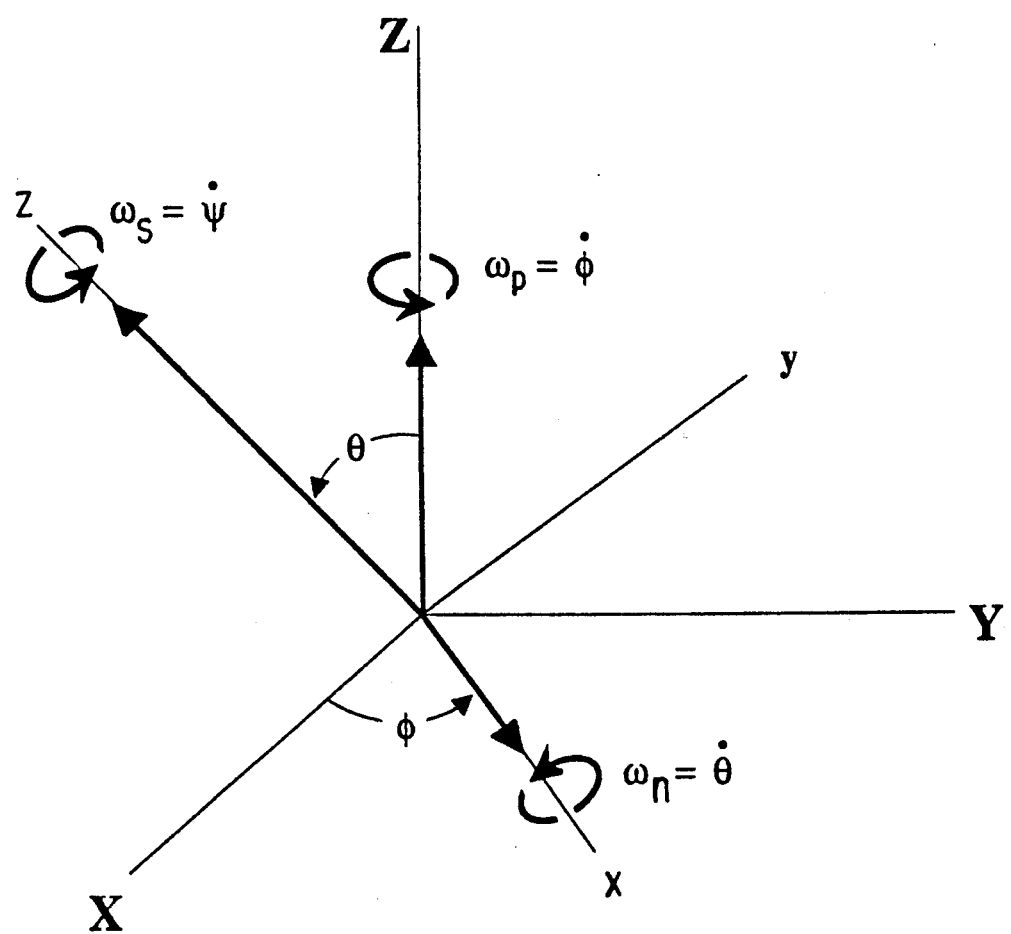
FIG. 10 is a diagram depicting the Euler angles utilized in the formulation of Euler's Equations of Motion.

The local node upon which sensors are mounted, if experiencing Own-Body motion, is presumed to be a symmetrical rigid body. Such a rigid body must behave according to the well known Euler's Laws of Motion whereby there exists a set of "fixed" X, Y, Z axes about which the orientation of the body coordinate x, y, z axes can be described by the three Euler angles $\phi$, $\theta$, $\Psi$ (phi, theta, psi) as shown in FIG. 10. The object of the Own-Body Motion Elimination process is to estimate the Euler angles at points in time and to map sensor data gathered in body coordinates into the "fixed" coordinates. The "fixed" coordinate frame, or some other coordinate frame at an arbitrary but constant relative orientation to the "fixed" coordinate frame is selected for each local node and is termed the Egocentric Coordinate Frame. The term Egocentric is meant to indicate that this coordinate frame is different for each local node and defines the location and orientation in space from which each local node views its environment.

The "fixed" coordinate frame is defined by the angular momentum vector of the dynamic rigid body and an azimuth reference. The angular momentum vector defines the orientation of the Z axis, and the azimuth reference establishes the orientation of the X and Y axes. There are many methods by which the azimuth reference may be generated, including but not limited to utilization of gyroscopic devices, accelerometers, gravitational field detectors, and azimuthal relationships to external energy sources. Each method has different performance, cost and complexity considerations. The only requirement imposed by the SW&RM invention regarding a specific choice of local node azimuth reference is that the difference between the azimuth reference of a particular local node Egocentric Coordinate Frame and that of another local node Egocentric Coordinate Frame has an angular frequency less than one half that of the rate at which measurement data or track data estimates are communicated to common fusion centers. This requirement is the result of the Nyquist criteria, and prevents aliasing of the orientation boresight angles between two Egocentric Coordinate Frames as estimated by the Mutual Orientation process.

Own-Body motion is estimated through a combination of the available sensor information, including sensor data for sensed external energy sources and onboard gyroscopic and/or other motion detection sensors. When gyroscopic devices are utilized, Own-Body motion may readily be estimated by simple filtering of the gyroscopic device output signals. When measurement signals from sensors which sense external energy sources are utilized, the signal filter must contain an additional level of complexity by which the various Own-Body motion components are revealed. There are countless possible methods by which Own-Body motion estimation may be accomplished based on the measurement signals from sensors that sense external energy sources. Examples of such methods include those described by T. Sen Lee, "Theory and Application of Adaptive Fading Memory Kalman Filters", IEEE Trans Circ. Sys. Vol. 35, No. 4, April 1988 pp 474–477, U.S. Pat. Nos. 4,560,120 issued to Crawford, and 4,347,996 issued to Grosso et al.

Each possible Own-Body motion estimation filter has associated trade-offs between accuracy and data processing power, and different filters are often better suited for different applications. Estimates of Own-Body motion provided by the various sensor signal filters must be combined according to a cost function which defines optimality for the particular application. The optimal estimate combines the Euler angle estimates obtained for all available sensor data. A suboptimal process may be desirable for some applications, however, to reduce processing requirements.

Once the local node motion parameters estimates are determined, sensor angular measurement data as represented within the body coordinates of a local node is transformed into the Egocentric Coordinate Frame chosen for the local node. This process is accomplished by applying the reverse Euler angle coordinate transformations. Equivalently, signal processing techniques may be utilized by which motion cancellation signals are formed based upon the estimated Euler angle phases and magnitudes. These cancellation signals are then added to the sensor signals. This coordinate frame mapping process may provide mapped data for each sensor measurement at a rate identical to the sensor measurement rate, or filtered mapped sensor data estimates at a lower rate than the sensor measurement rate.

In summary, the Own-Body Motion Elimination process receives, as input from the Measurement process of a particular local node, sensor measurement data. The process provides, as output, sensor data or sensor data estimates and possibly associated statistics as represented in the local node's Egocentric Coordinate Frame.

Fusion agent nodes perform SW&RM process computations utilizing local information and information received from the Communication process. The Communication process communicates sensor measurement data or track data estimates and possibly associated statistics from local nodes to these fusion agent nodes. The actual type and quantity of data transmitted and received depends upon system design considerations such as fusion system structure, available communication bandwidth, and desired accuracy. An optimal implementation of the SW&RM Tracking Method, for example, requires that each local node communicate every measurement value to a central fusion center. Global tracking estimates are formed for the optimal case as sets of measurements become available. This case usually requires a tremendous communications capability. Various suboptimal implementations do not require as great a communications bandwidth. Suboptimal implementations having reduced communications requirements generally require that the local nodes are also agents having processor means and that tracks are formed locally. If local nodes also act as fusion agents then the Communication process exchanges data between these cooperative local agent nodes and between local agent nodes and any higher level fusion agents. Track estimates and possibly estimate statistics are communicated to fusion centers at a rate lower than the sensor measurement rate. For multiple layer fusion system architectures such as an hierarchical system, the Communication process may possibly communicate global fused estimates back from higher level fusion agents to any lower level fusion agents.

In summary, the Communication process receives as input, and transmits as output, sensor measurement data or track data estimates and possibly associated statistics between local nodes and fusion agent nodes.

The Object Association and Tracking process is responsible for forming object state tracks for all tracked objects. The process utilizes sensor measurement data or track data estimates as available for any particular sensed or tracked object to update the object state track filter for that object. The process is actually an integration of two separate but closely linked subprocesses. The first subprocess, Object Association, is responsible for correctly associating sensor measurement data or track data estimates with the proper object. The second subprocess, Object Tracking, then updates the proper object track filter with the appropriate measurement data or track data estimates.

The Object Association process associates a set of multiple objects tracked by a sensor with the set of objects tracked by another sensor. Essentially, objects appearing to have identical trajectories and falling within a confidence contour (gate) are determined to be common to each set of tracked objects. The SW&RM Tracking Method requires that local nodes emit energy such that cooperative nodes can detect and track each other. The process of Object Association can made simpler in some circumstances if a local node, when emitting energy, also transmits a unique identification code. The SW&RM Tracking Method works best when cooperative local nodes are widely and symmetrically spaced. Sensor measurements and track data estimates of energy emitted by cooperative local nodes, therefore, are nearly always easier to associate then energy emitted by clusters of targets.

The Object Association process can become very complex when dense target clusters are being tracked. This field has received much attention and many object association techniques are described in the literature. A new wave of object association techniques are currently being investigated which utilize pattern recognition systems and neural networks. The SW&RM Tracking Method does not require any specific type of object association subsystem, and can accommodate any of the various subsystems currently in the public domain and any other known or future object association subsystem. Examples of public domain object association methods are those unclassified methods developed under government contract and those described by Yaakov Bar-Shalom, "Multitarget-Multisensor Tracking" published by Artech House, Dedham, Mass., 1990.

The Object Tracking process is executed by a fusion agent which may receive measurement data and/or track data estimates from many cooperative local nodes. The types of object state tracking filters employed by the Object Tracking process depends upon the sensors utilized by the local nodes which supply information to the process. Different types of sensors are available which provide different types of information regarding an object's geometry relative to the sensor. Sensors can measure various qualities of relative external object geometry dynamics, including range and bearing and several orders of the respective derivatives.

The SW&RM process can accommodate any of the countless types and varieties of object tracking filters, each of which is best suited for some specific set of tracking states, input data, and each of which trades differently between processing requirements, timeline restrictions and performance. Examples of various filters include: bearing-only tracking filters for bearing-only input data; bearing and range rate filters which can infer range through "own ship maneuvers," based on triangulation, circulation, or other techniques, and alpha-beta tracking filters where input data consists of both bearing and range data. The public domain is full of examples of possible track filters, such as: Hoelzer, H. D., "Range Normalized Coordinates for Optimal Angle-Only Tracking in Three Dimensions" published by Teledyne Brown Engineering, Huntsville, Ala., November, 1980, Stallard, D.V., "An Angle-Only Tracking Filter in Modified Spherical Coordinates" Proc., 1987 AIAA Guidance Navigation Central Conf., pp. 542-550, and Taek L. Song and Jason L. Speyer, "A Stochastic Analysis of a Modified Gain Extended Kalman Filter with Applications to Estimation with Bearings only Measurements" IEEE Trans. Automatic Control, AC-30, October 1985, pp. 940-949, and Russel F. Berg, "Estimation and Prediction for Maneuvering Target Trajectories", IEEE Trans. Automatic Control, AC-28, March 1983, pp. 294-304.

In summary, the Object Association and Tracking process accepts, as input, sensor measurement data or track data estimates and possibly associated statistics as made available by other processes. The output of the Object Association and Tracking process consists of estimates of dynamic system states, as required by other processes, which are detectable based upon system dynamic models and the data provided by other processes. This process output may also possibly include estimated state statistics depending upon the specific requirements of other processes. Any angular estimates and associated statistics are delivered in Cartesian coordinates in the form of unit direction vectors.

The Relative Geometry process estimates the relative geometry and relative geometry dynamics between the various triplets of local node pairs and mutually tracked objects including other local nodes. By relative geometry if is meant the shape of the triangle connecting the various combinations of local node pairs and mutually tracked third objects. This process is equivalent to the determination of the ratio of the distance from each local node to the third object to the distance between the local node pair. If range information is available, by relative geometry it is also meant the determination of the triangle size. Combinations of range, bearing, derivatives thereof, and associated statistics are utilized as the information is available to estimate each triangle shape and triangle shape dynamics. The Relative Geometry process may make use of, but does not require position information from any external navigation system or GPS as supplied by the Measurement process. Although structures having more legs than three may be estimated, these structures decompose into statistically equivalent combinations of local node and third object triplets.

Figure 11:
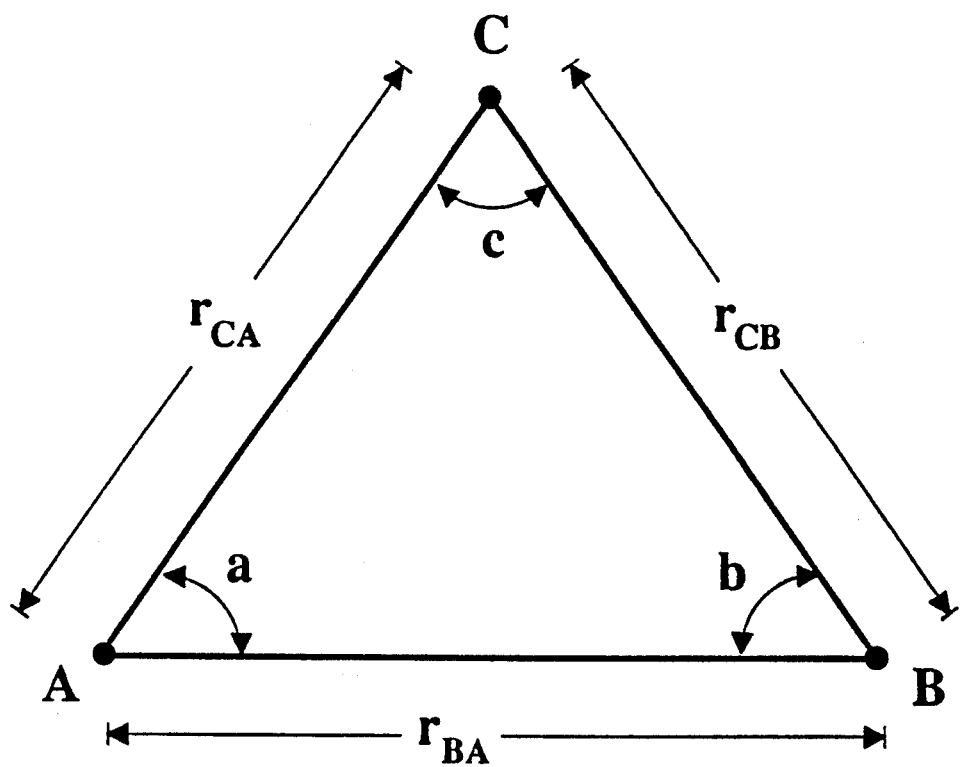
FIG. 11 depicts a triangle having vertices defined by the position of two SW&RM local nodes and a third object according to the present invention.

Consider the triangulation geometry of FIG. 11 composed of two local nodes A, B, and an energy emitting object, possibly a third local node, C. The points occupied in space by these three objects forms a plane, and these three points are the vertices of a triangle. This triangle has interior angles a, b, c, and legs of magnitude $r_{BA}$, $r_{CA}$, and $r_{CB}$ as shown. The following additional example definitions and terminology is provided:

$P_{BA} = S_{BA} r_{BA}$
$P_{AB} = S_{AB} r_{AB}$
$P_{CA} = S_{CA} r_{CA}$
$P_{CB} = S_{CB} r_{CB}$
$P_{AC} = S_{AC} r_{AC}$
$P_{BC} = S_{BC} r_{BC}$ where all possible position vectors between points A, B, an are shown such that $P_{BA}$, for example, is the position vector of B with respect to A such that the tail of the position vector is at A and the head at B; $S_{BA}$ is the unit direction vector of B with respect to A such that the tail of the position vector is at A and the head points at B; and $r_{BA}$ is the range from A to B.

Consider the set of ranges $\{r_{BA}, r_{CA}, r_{CB}\}$, and the set of angles $\{a, b, c\}$. Note that the minimal sets of information required to estimate the shape of the triangle requires subsets of information from the complete sets of ranges and angles as follows:

1) a vector consisting of all three range estimates from the range set, and possibly the associated covariance matrix;

2) a vector consisting of any two angle estimates from the angle set and possibly the corresponding covariance matrix;

3) a vector consisting of any two range estimates from the range set and any angle estimate from the angle set and possibly the corresponding covariance matrix.

With the preceding development as background, one clear requirement of the Object Association and Tracking process is that it minimally provide to the Relative Geometry process, estimates of angles and/or ranges and possibly statistical data sufficient to construct one of the previous three minimal information sets. Statistical data is required if triangle shapes are estimated using stochastic weighting factors. There are instances whereby statistical data may not be utilized and satisfactory results are still obtained. An example of such a case occurs when assumptions are made regarding the relative local node sensor performance. The assumption can often be made that cooperative local nodes have identical sensor capabilities or known relative capabilities. In such a case triangle shapes may be estimated utilizing Geometric Dilution of Precision (GDOP) factors. Note that the formulation of such assumptions is equivalent to estimating track data statistics suboptimally.

One minimal set of data which may be used to describe the shape of the triangle shown in FIG. 11 are the two ratios:

$$\beta_A = \frac{r_{CA}}{r_{BA}}, \text{ and } \beta_B = \frac{r_{CB}}{r_{BA}}$$

These ratios may be constructed from any of the three minimal information sets previously detailed. Given information set (1), for example, the ratios follow directly. The Law of Sines may be utilized to form the ratios from information set (2) as follows: First, the interior angles are constructed from the unit direction vectors by the dot product. Interior angles $\{a, b\}$, for example, may be determined utilizing the unit direction vectors resulting from the observations of local nodes A and B as follows:

$$a = \cos^{-1}\left(\frac{S_{BA} \cdot S_{CA}}{|S_{BA}||S_{CA}|}\right),$$

and $$b = \cos^{-1}\left(\frac{S_{AB} \cdot S_{CB}}{|S_{AB}||S_{CB}|}\right)$$

The Law of Sines provides the required ratios.

$$\beta_A = \frac{\sin(b)}{\sin(a+b)}, \text{ and } \beta_B = \frac{\sin(a)}{\sin(a+b)}$$

If, however, object C is also a local node then two estimates may be formed for each interior angle including the dot product result and the angle resulting from pi/2 minus the other two angles. These estimates may then be combined in some manner such as by a stochastic filter, the Maximum Likelihood Estimator as one example. The variance of each range ratio estimate may be estimated several different ways, including utilization of the Calculus of Variations together with variance estimates provided by the Object Association and Tracking process, and estimates based upon GDOP factors. The Law of Cosines and other geometrical relationships are utilized to handle information set (3).

Another requirement of the Relative Geometry process is that the triangle shape dynamics are estimated, or equivalently, that the various derivatives of $\beta_A$ and $\beta_B$ and the associated statistics are estimated. Again, there are endless ways of accomplishing this task, including implementation of a stochastic state tracking filter which has, as input, the estimates of $\beta_A$ and $\beta_B$ and associated statistics as determined previously. Another method utilizes Calculus techniques including the Product Rule and Chain Rule together with higher order derivative estimates supplied by the Object Association and Tracking process. Each known method will have performance and computation requirements trades, and the actual implemented approach will depend upon system design constraints.

Once the triangle shape, triangle shape dynamics, and associated statistics are determined, then any range and range derivative information immediately provides an estimate of the triangle size and size dynamics. If information regarding range and at least two angles is available, then each piece of range data may be mapped onto a common triangle leg via the range ratio estimates and fused. This procedure may be performed for each triangle leg, thus the statistics associated with estimates of range and range derivatives may be thereby improved. Any improved range estimates may possibly be fed back to the Object Association and Tracking process at this point, or possibly fed back later together with improved bearing estimates after the Perspective Mapping Process.

In summary, the Relative Geometry process accepts as input, the track data estimate output of the Object Association and Tracking process. The Relative Geometry process provides, as output, estimates of the range ratios and respective derivatives as previously described for each triplet of local node pairs and mutually tracked objects including other local nodes. Additionally, if information regarding range and at least two angles is available, then the process can provide improved range and respective derivative estimates. The Relative Geometry process also forwards input data received from the Object Association and Tracking process.

The Mutual Orientation process determines the relative orientation of pairs of local node Egocentric Coordinate Frames. The series of rotations required to orient the Egocentric Coordinate Frame of a local node, B, with that of another local node, A, is termed the boresight matrix $Q_{AB}$, whereby rotations are required about three axis in some specific non-commutative order. Consider, for example a series of rotations starting with a rotation about the x axis of the Egocentric Coordinate Frame of local node B, $R_{AB}(\phi)$, followed by a rotation about the resulting y axis, $R_{AB}(\theta)$, followed by a rotation about the resulting z axis, $R_{AB}(\Psi)$.

$$Q_{AB} = R_{AB}(\Psi) \, R_{AB}(\theta) \, R_{AB}(\phi)$$

All of the three rotations are required when local nodes are at arbitrary orientations in three dimensions. The general case of three dimensions will be examined, and cases involving two dimensions are degenerative cases of the three dimensional problem. The unit vector of the Egocentric Coordinate Frame of local node B, for example, is oriented identically in space with the unit vector of the Egocentric Coordinate Frame of local node A through application of the boresight matrix $Q_{AB}$, as follows:

$$S_A = Q_{AB} S_B$$

Once the Egocentric Coordinate Frame of a first local node is oriented identically with the Egocentric Coordinate Frame of a second local node, mutual vector operations are possible. Consider the following example whereby local nodes A and B construct unit direction vectors to each other within the orientation of the Egocentric Coordinate Frame of local node A.

$$S_{BA} = -Q_{AB} S_{AB}, \text{ or } S_{BA} + Q_{AB} S_{AB} = 0$$

Additionally, consider the position vector addition possibilities utilizing the relative position vectors between local nodes A and B and a third object, C.

$$P_{CA} = Q_{AB}(P_{CB} - P_{AB})$$

$$P_{CA} = P_{BA} + Q_{AB} P_{CB}$$

Any two of the previous three relationships are independent. Either of the last two relationships may be developed from the other, together with the earlier simple direction vector relationship. The previous two relationships may be range normalized by dividing through with the range between local nodes A and B. The relationships may be expressed utilizing the previously determined range ratios $\beta_A$ and $\beta_B$ as follows:

$$\beta_A S_{CA} = Q_{AB}(\beta_B S_{CB} - S_{AB})$$

$$\beta_A S_{CA} = S_{BA} + \beta_B Q_{AB} S_{CB}$$

The rotation matrix $Q_{AB}$ is estimated utilizing the appropriate method suiting the requirements of the particular application. Methods for determining $Q_{AB}$ include utilization of results from multivariate stochastic analysis, application of nonlinear least squares techniques, and various numerical techniques. Estimates of the rotation matrix $Q_{AB}$, or equivalently the rotation angles $\phi$, $\theta$, and $\Psi$ are obtained utilizing each possible triplet of local nodes A and B and third objects together with the simple case involving only the unit direction vectors of local nodes A and B directed towards each other. An estimate is also possibly obtained for the covariance matrix of $Q_{AB}$ or the statistics associated with the rotation angles $\phi$, $\theta$, and $\Psi$. All estimates of $Q_{AB}$, or equivalently $\phi$, $\theta$, and $\Psi$, are then combined using an appropriate method such simple averaging utilizing a priori assumptions and GDOP factors, or with a stochastic filter, a possible example being the combined Maximum Likelihood estimate.

If $Q_{AB}$ is dynamic the derivatives of $Q_{AB}$ and possibly the associated statistics must also be estimated. Again, there are endless ways of accomplishing this task, including implementation of a stochastic state tracking filter which has, as input, the estimates of $Q_{AB}$ and associated statistics as determined previously. Another method utilizes Calculus techniques including the Product Rule and Chain Rule together with higher order derivative estimates supplied by the Relative Geometry process. Multivariate analysis techniques are better suited for some applications. Each known method will have performance and computation requirements trades, and the actual implemented approach will depend upon system design constraints.

The previous procedures are described for an arbitrary local node pair A and B. The procedures, however, are implemented for each possible local node pair combination in the manner described. In summary, the Mutual Orientation process accepts, as input, the output of the Relative Geometry process. The Mutual Orientation process provides, as output, estimates of the boresight matrix, Q, or equivalently the rotation angles $\phi$, $\theta$, and $\Psi$, and possibly the associated statistics for each pair of processed local nodes. Additionally, if a particular boresight matrix is dynamic, derivative information for that boresight matrix and possibly associated statistics are also provided. The Mutual Orientation process also forwards the data provided by the Relative Geometry process to the Perspective Mapping process.

The Perspective Mapping process utilizes the results of previous processes to map track data provided by each local node onto common coordinate frames. Choice of the common coordinate frames depends upon the required use of fusion estimates. Most fusion system architectures, for example, are able to utilize fused estimates within the Egocentric Coordinate Frames of every local node. Fusion estimates may be passed along to the application as required, and fed back to the Object Association and Tracking process so that track filters may be updated with the fused estimates.

For the purposes of illustration, the Perspective Mapping process is demonstrated for the case of track estimates of an object, C, as formed from the observations of a local node, A, and those of other cooperative local nodes. The track estimates of C formed from cooperative local nodes are mapped into the Egocentric Coordinate Frame and relative geometry of local node A. Independent equations which may be utilized to accomplish the mapping procedure are any pair of independent equations utilized by the Mutual Orientation process, such as:

$$S_{BA} = -Q_{AB} S_{AB}$$

$$\beta_A S_{CA} = S_{BA} + \beta_B Q_{AB} S_{CB}$$

Every term of these equations has been estimated by previous processes. The required fusion estimate is the track bearing estimate of object C from the perspective of local node A, $S_{CA}$, as mapped from the perspective of local node B, the notation for which is $S_{CA}^B$. The previous equations may be reorganized in terms of the required quantity to produce the following perspective mapping equations:

$$S_{BA} = -Q_{AB} S_{AB}$$

$$S_{CA}^B = \frac{1}{\beta_A} (S_{BA} + \beta_B Q_{AB} S_{CB}).$$

The first step of the Perspective Mapping process is to improve the track estimates of bearing and associated derivatives between local nodes by utilizing the simple mutual observation equation. Utilizing this equation, the two estimates of $S_{BA}$ are: first, the track bearing estimate of local node A observing B, $S_{BA}$, and secondly the track bearing estimate of local node B observing A, $-Q_{AB} S_{AB}$, as mapped into the Egocentric Coordinate Frame of A. The two estimates, $S_{BA}$, and $-Q_{AB} S_{AB}$, are then combined to yield an improved estimate of $S_{BA}$, which is then substituted in the second equation. The second equation then provides the track bearing estimate of object C from the perspective of local node A, $S_{CA}$, as mapped from the perspective of local node B, $S_{CA}^B$. Weightings utilized to combine the two estimates may be determined from either estimated statistics available from previous processes, or from assumptions regarding the relative performance of the sensors of local nodes A and B together with GDOP factors. Other methods may be satisfactory for some applications. Less demanding applications, for example, might utilize constant weightings.

The two equations are implemented for each cooperative local node, B, each cooperative local node providing a mapped estimate, $S_{CA}^B$. Each such mapped estimate, together with the original track estimate based on the observations of local node A, are combined utilizing any suitable combination method such as a stochastic filter to produce a fused estimate of $S_{CA}$. The notation for the fused estimate is $S_{CA}^f$. The entire process is repeated for each local node such that each local node is treated as local node A, while other cooperative local nodes are treated as B.

Fusion estimates of higher order derivatives may be estimated several ways. Each method will have performance and computation requirements trades, and the actual implemented approach will depend upon system design constraints. One possible method utilizes Calculus techniques including the Product Rule and Chain Rule together with higher order derivative estimates of the various terms of the perspective mapping equations as supplied by previous processes. The mapped first derivative estimates, assuming a constant boresight matrix for example, are given by the following equations:

$$\dot{S}_{BA} = -Q_{AB} \dot{S}_{AB}$$

$$\dot{S}_{CA}^B = \frac{1}{\beta_A} [\dot{S}_{BA} + Q_{AB}(\beta_B \dot{S}_{CB} + \dot{S}_{CB}\beta_B)] - \frac{\dot{\beta}_A}{\beta_A^2} (S_{BA} + \beta_B Q_{AB} S_{CB})$$

Fusion estimates may be fed back into the fusion equation sets and the process reiterated, and the fusion estimates may also be fed back to the Object Association and Tracking process for update of track filters. The data is fused utilizing weightings according to the chosen combination method suitable for the particular application. One possible method generates fusion estimates based on estimated data statistics as provided by previous processes. Other alternative methods are suitable for some applications, but such methods, however, are suboptimal. The statistics of the mapped estimates, for example, may be estimated from GDOP factors and the statistics of each unit direction vector.

Finally, fusion estimates, $S_{CA}^f$, for each local node, A, are forwarded to the Application Interface process, as required, which then makes fusion estimates available to the application.

Although only a few specific examples of the SW&RM Tracking Method have been described with respect to various fusion system architectures, it is noted that any other combinations of the SW&RM processing blocks may be employed in any desired fusion system architecture, in which case the information flow may be slightly different from the one described for the sensor-level fusion example. The basic SW&RM processing functions, however, will remain identical.

Furthermore, with respect to methods utilizing estimated statistics, it is noted that some applications restrict available communications bandwidth, such as those applications in which cost is a primary concern, and those defense applications where energy emission quiet hardware is required. For such applications only minimal sets of information can be transmitted, and it might be desirable to communicate track data estimates but not estimates of statistics. In such cases combination weighting factors as required by many of the SW&RM processes may be determined utilizing a priori assumptions and GDOP factors or by some other suboptimal method. A specific combination methodology, therefore, is not embraced, as doing so will eliminate many useful applications of the SW&RM Tracking Method.

Although the invention has been described in connection with certain specific embodiments, it will be readily apparent to those skilled in the art that various changes in form and arrangement may be made without departing from the spirit and scope of the invention.

What is claimed is:

1. A method of tracking the relative geometry and relative orientation of two or more tracking stations, and the additional relative geometry of other objects with respect to said tracking stations utilizing at least two tracking stations and at least one fusion center, including the steps of:

sensing, at each tracking station, energy emissions arriving from other tracking stations and other objects, said energy emissions including information relating to the relative geometry of the tracking stations and the other objects;

forwarding sensor data relating to the relative geometry of each tracking station with respect to other tracking stations and with respect to other objects to a means for processing said sensor data, which determines the mutual relative geometry of each tracking station with respect to a second tracking station without utilizing attitude information local to each tracking station;

estimating components of the relative geometry of each tracking station with respect to other tracking stations and other objects, said estimating components step conducted in said processing means;

forwarding information between said means for processing said sensor data and at least one fusion center regarding the relative geometry of each tracking station with respect to other tracking stations and other objects;

estimating the relative orientation of pairs of tracking station Egocentric Coordinate Frames, said estimating step conducted in said means for processing said sensor data; and estimating the relative geometry of triplets of two tracking stations and one other object, said estimating step conducted in said means for processing said sensor data.

2. The method in accordance with claim 1 further including the step of mapping information regarding the relative geometry, and dynamics thereof, of objects represented within the Egocentric Coordinate Frame of tracking stations onto the Egocentric Coordinate Frame of other tracking stations, and further refining estimates of the relative geometries of each tracking station with respect to other tracking stations and other objects by combining multiple estimates of objects which are represented within common Egocentric Coordinate Frames, said means for processing said sensor data.

3. The method in accordance with claim 1, wherein said step of estimating components of the relative geometry of each tracking station with respect to other tracking stations, additionally includes the step of estimating the associated dynamics of the relative geometries of each tracking station with respect to other tracking stations, said step of estimating the associated dynamics conducted in said means for processing said sensor data.

4. The method in accordance with claim 1, wherein said step of forwarding information between said means for processing said sensor data and at least one fusion center additionally includes the exchange of information regarding estimates of the dynamics of said relative geometries.

5. The method in accordance with claim 1, wherein the said step of estimating the relative orientation of pairs of Egocentric Coordinate Frames additionally includes the step of estimating the associated dynamics of said relative orientations, said additional step conducted in said means for processing said sensor data.

6. The method in accordance with claim 1, wherein the said step of estimating the relative orientation of triplets of two tracking stations additionally includes the step of estimating the associated dynamics of the relative geometry of triplets of two tracking systems, said additional step conducted in said means for processing said sensor data.

7. The method in accordance with claim 1, wherein the results of said step of estimating the relative orientation of triplets of two tracking stations are transmitted to said step of estimating components of relative geometries.

8. The method in accordance with claim 2, wherein the results of said steps of mapping information and further refining estimates of the relative geometries is forwarded to said step of estimating components of the relative geometry of each tracking station with respect to other tracking stations.

9. The method in accordance with claim 1, wherein said means for processing said sensor data is provided at any number of tracking station locations, at any number of remote locations, or at a combination of any number of tracking station locations and remote locations.

10. The method in accordance with claim 1, including the step of generating an energy beam from each of the tracking stations directed at an object other than another tracking station.

11. The method in accordance with claim 1, including the step of generating an energy beam which emanates from a tracking station and arrives at any number of other tracking stations.

12. The method in accordance with claim 11 wherein said energy beam includes a code unique to the tracking station generating said energy beam.

13. The method in accordance with claim including the steps of estimating any time parameters of the rotational motion of any number of the tracking stations, and forwarding the data generated by this step to said means for processing said sensor data, said step of estimating any time parameters being conducted in said means for processing said sensor data.

14. The method in accordance with claim 13, including the steps of utilizing said time parameters to map the sensor data measured by said tracking stations onto a coordinate frame referenced to an inertial reference or a pseudo-inertial reference, and forwarding the data generated by this step to said processing means, said step of utilizing said time parameters to map the sensor data conducted in said means for processing said sensor data.

15. The method in accordance with claim 13, including the steps of utilizing said time parameters to map the results of said step of estimating components of relative geometry of each tracking stations with respect to other tracking stations onto a coordinate frame referenced to an inertial reference or a pseudo-inertial reference, and forwarding the data generated by this step to said means for processing said sensor data, said step of utilizing said time parameters to map the step of estimating components conducted in said means for processing said sensor data.

16. The method in accordance with claim 14 wherein said inertial reference or said pseudo-inertial reference utilizes the angular momentum vector of said tracking station and an additional reference about said angular momentum vector, wherein said additional reference may be provided by an inertial reference or by reference to an energy source or to a field of potential energy.

17. The method in accordance with claim 15 wherein said inertial reference or said pseudo-inertial reference utilizes the angular momentum vector of said tracking station and an additional reference about said angular momentum vector, wherein said additional reference may be provided by an inertial reference or by reference to an energy source or to a field of potential energy.

18. The method in accordance with claim 1 including the steps of mapping sensor data onto a coordinate frame related to the orientation of the tracking station if said tracking station does not experience rotational rigid body motion, and forwarding the data generated by this step to said processing means, said mapping sensor data onto a coordinate frame step conducted in said means for processing said sensor data.

19. The method in accordance with claim 1, wherein relative range and/or bearing and/or the respective time derivative information is estimated.

20. A system for tracking the relative geometry and relative orientation of two or more tracking stations, and the additional relative geometry of other objects with respect to said tracking stations including:
   any number of fusion centers including a receiver and an information processor which determines the mutual relative geometry of each tracking station with respect to a second tracking station without utilizing attitude information local to each tracking station;
   the present of at least one information processor within the collection of said tracking stations and said fusion centers;
   a plurality of tracking stations for sensing of information related to the relative geometry of said tracking stations and possibly other objects, each of said tracking station including,
   energy generating means for directing energy emission toward at least one other tracking station;
   sensing means for sensing energy emissions arriving at each of said tracking stations, said energy emissions including data relating to the relative geometry of said tracking station with respect to any combination of other tracking stations and other objects; and
   communication device provided on each of said tracking stations for exchanging data with, or transmitting data to, any combination of other said tracking stations and said fusion centers.

21. The system in accordance with claim 20, wherein any number of said tracking stations also has energy generating means for directing energy emission toward at least one object other than said tracking stations.

22. The system in accordance with claim 20, wherein any number of said tracking stations has information processing means.

23. The system in accordance with claim 20, wherein any number of said fusion centers has communications transmission means.

24. The system in accordance with claim 20, wherein any number of said fusion centers is remote from each of said tracking station.

25. The system in accordance with claim 20 wherein any number of said tracking stations is provided with a means for sensing time parameters of the motion of each respective tracking station.

26. The system in accordance with claim 20, wherein each of said energy generating means generates a code unique to each of said tracking stations.

27. The system in accordance with claim 21, wherein each of said energy generating means generates a code unique to each of said tracking stations.

* * * * *